July 3, 1951 W. W. HANSEN ET AL 2,558,749
HIGH-FREQUENCY IMPEDANCE TRANSFORMER
Original Filed May 17, 1941
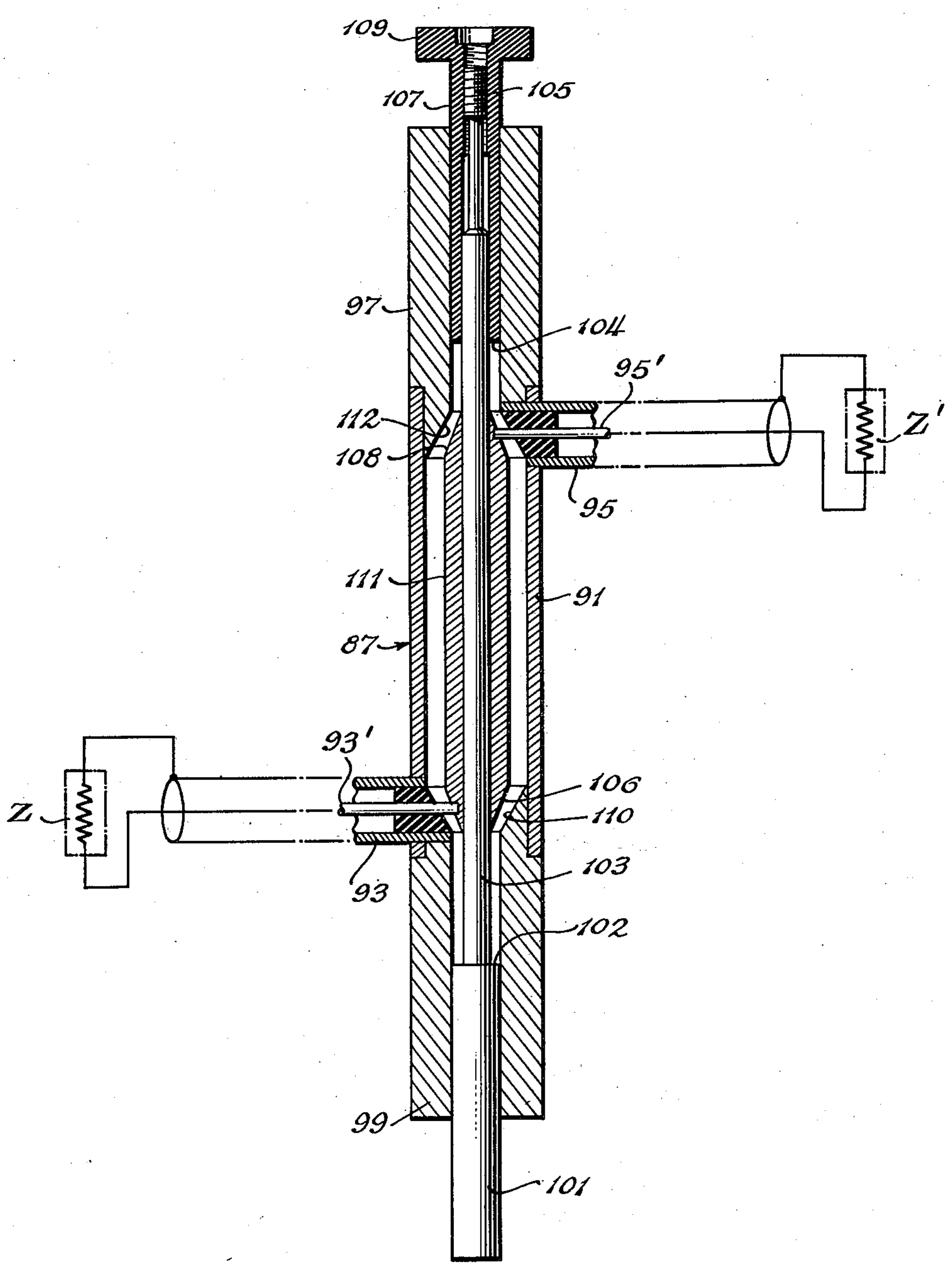
INVENTORS
WILLIAM W. HANSEN
JOHN R. WOODYARD
BY Paul B. Hunter
ATTORNEY Patented July 3, 1951 2,558,749

UNITED STATES PATENT OFFICE 2,558,749

HIGH-FREQUENCY IMPEDANCE TRANSFORMER

William W. Hansen, Stanford University, and John R. Woodyard, Berkeley, Calif., assignors to The Sperry Corporation, a corporation of Delaware Original application May 17, 1941, Serial No. 393,868. Divided and this application March 22, 1946, Serial No. 656,200

7 Claims. (Cl. 178—44)

The present invention relates generally to the art of high frequency energy transmission and apparatus related thereto, and has reference more particularly to novel improvements in impedance matching and transforming devices adapted for use with this type of apparatus and operating at super-high frequencies of the order of a billion cycles per second and higher. The present application is a division of copending application Serial No. 393,868 for High Frequency Apparatus filed May 17, 1941, now U. S. Patent No. 2,406,372, issued August 27, 1946.

In transferring energy from one high-frequency device to another, it is well known that the values of the impedances of the respective devices must be properly matched in order to avoid production of standing waves with attending increase in loss and decrease in the energy-transmitting capacity of the system. Furthermore, for maximum efficiency, it is known that the impedance of a load or utilization device must be properly transformed to match that of the source.

Accordingly, the present invention is primarily directed toward the provision of an improved impedance matching and transforming device which is adapted to efficiently couple circuit elements interconnected thereby and to match the impedance values of said elements with a minimum of adjustment and a maximum of facility and efficiency.

A principal object therefore of the present invention is to provide novel impedance-matching or -transforming means for matching the impedance of an apparatus of the above character to that of another apparatus, such impedance-matching means being designed for versatile operation in that it may efficiently couple two impedance elements having impedances of different values with high efficiency of power flow therebetween.

Another object of the present invention is to provide novel impedance-matching means which are so designed as to efficiently match both the resistive and the reactive components of the impedance elements interconnected thereby and having generally different impedance values.

A further object of the present invention is to provide an improved impedance-matching transformer having a minimum number of adjustments and a maximum range of transformations.

The invention in another of its aspects relates to novel features of the instrumentalities described herein for achieving the principal objects of the invention and to novel principles employed in those instrumentalities, whether or not these features and principles are used for the said principal objects or in the same field.

A further object of the invention is to provide improved apparatus and instrumentalities embodying novel features and principles, adapted for use in realizing the above objects and also adapted for use in other fields.

A feature of the present invention lies in the novel arrangement of coaxial transmission line elements whereby the electrical length of a predetermined section of line connecting a pair of impedance elements to be matched is rendered adjustable independently of the axial disposition of the impedance elements relative to said line section.

Other objects and advantages will become apparent from the specification taken in connection with the accompanying drawing wherein the single figure is a longitudinal cross-sectional view, partly diagrammatic, of the impedance-matching device of the present invention and its circuit.

Referring now to the drawing, the figure illustrates a concentric line impedance transformer or matching device 87 which is suitable for connecting and matching any circuit element having a general impedance value Z to another circuit element having, in general, an other impedance value Z′. Transformer 87 is illustrated as comprising a central sleeve or outer conductor 91 in which are mounted the ends of spaced concentric transmission 93, 95, whose outer conductors are rigidly connected to sleeve 91 and whose inner conductors 93′, 95′ extend radially inwardly of the sleeve 91. The lines 93, 95 may be open stub lines or terminal posts having their remote ends adapted for connection, in any well-known manner, to other transmission lines or to the circuit elements having impedances Z and Z′ respectively.

Two cylindrical end members 97, 99 are provided with bores of suitable diameter for receiving a slidable shorting-plug 101 carrying a reduced-diameter rod 103. The diameter of the bore in member 99 and the diameter of rod 103 are suitably selected to form an efficient concentric transmission line. The other end of rod 103, illustrated as reduced, is threaded as at 105 upon which threaded portion is mounted shorting-plug 107 which fits snugly but slidably within the bore of member 97. Plug 107 has an enlarged portion 109 serving as a knob whereby the distance between inner faces 102, 104 of plugs 101, 107, respectively, may be varied by rotating knob 109, and the entire unit comprising plugs 101, 107 and rod 103 may be axially slidably positioned back and forth within outer members 97, 99 and sleeve 91 by longitudinal motion of knob 109.

Rod 103 slides within a fixed sleeve 111, whose outer diameter is suitably selected so that it bears the same ratio to the inner diameter of sleeve 91 that the diameter of rod 103 bears to the bore of members 97, 99. Sleeve 111 is permanently connected to the inner conductors 93′, 95′ of transmission lines 93, 95 and is therefore stationary with respect to outer sleeve 91 as well as to members 97, 99, sleeve 111 is tapered to the dimension of rod 103 at its end portions, as illustrated at 106 and 108. Members 97, 99 have corresponding internal tapers 110, 112. The respective tapers 106, 110 and 108, 112 are so selected as to maintain constant the ratio of the magnitudes of the outer diameter of the inner conductor to that of the inner diameter of the outer conductor, thereby maintaining substantially constant characteristic impedance for all sections of the concentric line element.

The mode of operation of the above-described impedance transformer is as follows: Knob 109 is rotated until the distance between the inner faces 102, 104 of the shorting-plugs 101, 107 is approximately one-half wavelength at the operating frequency. Then the entire inner portion comprising rod 103 and plugs 101, 107 is slid back and forth as a unit until proper match is obtained. At the optimum point, the impedance Z of the device connected to the transformer 87, by means of the transmission line 93, in parallel with the short-circuited section 103, 99 below the connected point of line 93, is matched over the length of line between the connecting point of transmission line 93 and that of transmission line 95, to the impedance Z′ of the device connected to line 95 in parallel with the short-circuited stub 103, 97 above the connecting point of transmission line 95.

The impedance transformer 87 will match, with certain limitations, a device of any impedance value to another device of any impedance value connected therethrough. It is perfectly symmetrical in action; that is, when a lower impedance value is to be matched to a higher impedance value, the device having either one may be connected to either terminal of the transformer 87.

It will be understood that while the present invention has been described in connection with coaxial transmission lines, it is not to be construed as being limited thereto inasmuch as similar and equally advantageous results are obtainable when embodied in wave guide or other high frequency wave energy conducting structures.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A coaxial line impedance transformer comprising a tubular outer conductor, means connecting the outer conductors of two coaxial transmission lines to said tubular outer conductor at spaced points thereon, a slidable inner conductor positioned to cooperate with said tubular conductor to form a coaxial line section therewith, two shorting plugs carried by said slidable inner conductor at the ends thereof respectively and adapted to short-circuit said tubular conductor to said inner conductor at said ends of said inner conductor, said plugs being slidable within said tubular conductor, means to adjust the length of the portion of said inner conductor between said short-circuited end, and means to connect the inner conductors of said two coaxial transmission lines through sliding contact to spaced points of said inner conductor corresponding to said spaced points of said tubular conductor.

2. Apparatus as in claim 1 wherein said inner conductor is formed of a rod and sleeve, said sleeve being coaxially disposed relative to and surrounding a portion of said rod.

3. Apparatus as in claim 2 wherein said sleeve is fixed relative to said tubular outer conductor and adapted to receive the inner conductors of the two coaxial transmission lines.

4. A coaxial line impedance transformer for matching the impedances of two circuit elements comprising a tubular sleeve having a bore of a predetermined inner diameter, two further sleeves having equal bores of diameter less than that of said tubular sleeve coaxially positioned at each end of said tubular sleeve, each of said further sleeves including a tapered section between the bore of said further sleeve and the bore of said tubular sleeve, two plugs slidably engaging the bores of said further sleeves respectively, a rod of diameter less than that of said plugs connected between said plugs, one end of said rod being threaded into one of said plugs, whereby the distance between said plugs may be adjusted by turning said one plug with respect to said rod, a second tubular sleeve positioned around and slidingly fitting said rod, said second tubular sleeve having tapered ends disposed adjacent the tapered portions of said further sleeves, the dimensions of said bores, the inner diameter of said first tubular sleeve, the outer diameter of said rod and said second tubular sleeve, and said tapered portions being so proportioned that the ratio of the inner diameter of the assembled tubular sleeve and said further sleeves to the outer diameter of the assembled rod and second tubular sleeve at all points along the rod and along said second tubular sleeve is maintained substantially constant.

5. A transformer as defined in claim 4 further characterized by two transmission lines having their outer conductors rigidly connected to said first tubular sleeve and to a respective one of said further sleeves at the tapered portions thereof, and their inner conductors fixedly connected to said second tubular sleeve at its tapered portions.

6. An impedance transformer comprising a tubular outer conductor, means connecting the outer conductors of two coaxial transmission lines to said tubular outer conductor at spaced points thereon, a slidable inner conductor positioned to cooperate with said tubular outer conductor to form a coaxial transmission line section therewith, shorting means carried by each end of said inner conductor and connecting each said end to said outer conductor, means connecting the inner conductors of said two coaxial transmission lines through sliding contact to spaced points of said inner conductor corresponding to said spaced points of said tubular outer conductor, and means for adjusting the effective length of said slidable inner conductor between said shorting means.

7. An impedance transformer including an outer conductor means, an inner conductor positioned to cooperate with said outer conductor to form a transmission line section therewith, a shorting plug at each end of said inner conductor means and adapted to short circuit said outer conductor to said inner conductor means at each end of said inner conductor means, means for adjusting the distance between said shorting plugs to vary the effective length of said transmission line section, said last-named means including said inner conductor means, two coaxial transmission lines having their outer conductors connected to said outer conductor of said line section at spaced points therealong and having their inner conductors connected to said inner conductor means of said line section at correspondingly spaced points therealong, and means for adjusting both of said shorting plugs as a unit axially along said outer conductor to vary the effective positions of said transmission lines on said line section, said last-named means including said inner conductor means.

WILLIAM W. HANSEN.
JOHN R. WOODYARD.

REFERENCES CITED

The following references are of record in the file of this patent:

UNITED STATES PATENTS

| Number | Name | Date |
|---|---|---|
| 1,921,117 | Darbord | Aug. 8, 1933 |
| 1,927,393 | Darbord | Sept. 19, 1933 |
| 2,000,032 | Lindenblad | May 7, 1935 |
| 2,041,378 | Smith | May 19, 1936 |
| 2,106,769 | Southworth | Feb. 1, 1938 |
| 2,177,272 | Zottu | Oct. 24, 1939 |
| 2,203,481 | Zottu | June 4, 1940 |
| 2,232,179 | King | Feb. 18, 1941 |
| 2,238,438 | Alford | Apr. 15, 1941 |
| 2,284,529 | Mason | May 26, 1942 |

Certificate of Correction

Patent No. 2,558,749 July 3, 1951

WILLIAM W. HANSEN ET AL.

It is hereby certified that error appears in the printed specification of the above numbered patent requiring correction as follows:

Column 2, line 31, after "transmission" insert *lines*; column 4, line 74, after "conductor", second occurrence, insert *means*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*